(12) United States Patent
Cui et al.

(10) Patent No.: US 10,028,194 B2
(45) Date of Patent: *Jul. 17, 2018

(54) NETWORK BASED SPEED DEPENDENT LOAD BALANCING

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US); Ye Chen, Milton, GA (US); Hongyan Lei, Plano, TX (US); Cheng P. Liu, Johns Creek, GA (US); Yonghui Tong, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/980,366

(22) Filed: Dec. 28, 2015

(65) Prior Publication Data

US 2016/0112927 A1    Apr. 21, 2016

Related U.S. Application Data

(63) Continuation of application No. 14/059,401, filed on Oct. 21, 2013, now Pat. No. 9,226,197.

(51) Int. Cl.
*H04W 36/30* (2009.01)
*H04W 28/08* (2009.01)
(Continued)

(52) U.S. Cl.
CPC ........... *H04W 36/30* (2013.01); *H04W 28/08* (2013.01); *H04W 36/0016* (2013.01);
(Continued)

(58) Field of Classification Search
CPC ... H04W 28/08; H04W 40/026; H04W 16/32; H04W 36/14
(Continued)

(56) References Cited

U.S. PATENT DOCUMENTS 5,839,070 A    11/1998  Lupien et al.
5,953,677 A    9/1999   Sato
(Continued)

FOREIGN PATENT DOCUMENTS

AU    2005320356    12/2005
EP    2244503       10/2010
(Continued)

OTHER PUBLICATIONS

U.S. Office Action dated Feb. 25, 2016 in U.S. Appl. No. 13/707,535.
(Continued)

*Primary Examiner* — Phuoc H Doan
(74) *Attorney, Agent, or Firm* — Hartman & Citrin LLC

(57) ABSTRACT

A mobile device mobility state is included in device reporting to a radio access network for mobility event and load balancing purposes. Respective load conditions and respective coverage areas of a first set of devices of a first network and a second set of devices of a second network are analyzed. In addition, a mobility state of a mobile device, a first signal strength associated with the first set of devices, and a second signal strength associated with the second set of devices are also analyzed. The mobility state is a function of a movement pattern of the mobile device and a speed at which the mobile device is being moved. Network traffic of the mobile device is routed to a set of network devices selected from the first set of devices and the second set of devices, as a result of the analysis.

9 Claims, 10 Drawing Sheets

(51) Int. Cl.
*H04W 40/02* (2009.01)
*H04W 48/20* (2009.01)
*H04W 40/08* (2009.01)
*H04W 36/00* (2009.01)
*H04W 36/14* (2009.01)
*H04W 36/32* (2009.01)
*H04W 84/00* (2009.01)

(52) U.S. Cl.
CPC ....... *H04W 36/0088* (2013.01); *H04W 36/14* (2013.01); *H04W 36/32* (2013.01); *H04W 40/026* (2013.01); *H04W 40/08* (2013.01); *H04W 48/20* (2013.01); *H04W 84/00* (2013.01)

(58) Field of Classification Search
USPC .................. 455/444, 441, 436, 418, 419
See application file for complete search history.

(56) References Cited

U.S. PATENT DOCUMENTS

| | | |
|---|---|---|
| 6,314,308 B1 | 11/2001 | Sheynblat et al. |
| 6,430,168 B1 | 8/2002 | Djurkovic et al. |
| 6,628,946 B1 | 9/2003 | Wiberg et al. |
| 7,082,305 B2 | 7/2006 | Willars et al. |
| 7,116,970 B2 | 10/2006 | Brusilovsky et al. |
| 7,146,130 B2 | 12/2006 | Hsu et al. |
| 7,299,019 B1 | 11/2007 | Austin et al. |
| 7,400,600 B2 | 7/2008 | Mullany et al. |
| 7,400,886 B2 | 7/2008 | Sahim et al. |
| 7,440,755 B2 | 10/2008 | Balachandran |
| 7,496,060 B2 | 2/2009 | Ramirez et al. |
| 7,508,781 B2 | 3/2009 | Liu et al. |
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulous |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 9,107,112 B2 | 8/2015 | Zsimopoulos |
| 9,319,975 B2 | 4/2016 | Esparza et al. |
| 9,516,577 B2 | 12/2016 | Punz |
| 9,591,556 B2 | 3/2017 | Ventimiglia et al. |
| 9,648,555 B2 | 5/2017 | Gupta |
| 9,661,544 B2 | 5/2017 | Jamadagni et al. |
| 9,736,762 B2 | 8/2017 | Sirotkin |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2005/0227696 A1 | 10/2005 | Kaplan et al. |
| 2006/0128394 A1 | 6/2006 | Turina et al. |
| 2006/0166677 A1 | 7/2006 | Derakshan et al. |
| 2006/0199608 A1 | 9/2006 | Dunn et al. |
| 2007/0026854 A1 | 2/2007 | Nath |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1 | 11/2007 | Hande et al. |
| 2007/0286092 A1 | 12/2007 | Famolari et al. |
| 2008/0144577 A1 | 6/2008 | Huang et al. |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1 | 10/2009 | Vigue et al. |
| 2010/0048205 A1 | 2/2010 | Guilford et al. |
| 2010/0056153 A1 | 3/2010 | Attar et al. |
| 2010/0056181 A1 | 3/2010 | Rippon et al. |
| 2010/0110890 A1 | 5/2010 | Rainer et al. |
| 2010/0136978 A1* | 6/2010 | Cho ............... H04W 36/14 455/441 |
| 2010/0149971 A1 | 6/2010 | Noriega |
| 2010/0216469 A1 | 8/2010 | Yi et al. |
| 2010/0234021 A1 | 9/2010 | Ngai et al. |
| 2010/0234042 A1 | 9/2010 | Chan et al. |
| 2010/0255849 A1 | 10/2010 | Ore |
| 2010/0267384 A1 | 10/2010 | Dwyer et al. |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1 | 12/2010 | Mueck et al. |
| 2010/0323701 A1* | 12/2010 | Enzmann ............. H04W 36/14 455/436 |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0105120 A1 | 5/2011 | Abdel-Samad |
| 2011/0110300 A1 | 5/2011 | Sachs |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1 | 7/2011 | Yang et al. |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1 | 8/2012 | Bienas |
| 2012/0214525 A1 | 8/2012 | Fujii et al. |
| 2012/0236717 A1 | 9/2012 | Saska et al. |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1 | 1/2013 | Dimou et al. |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |

(56) References Cited

U.S. PATENT DOCUMENTS

| | | |
|---|---|---|
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1 | 2/2013 | Lee et al. |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0084849 A1 | 4/2013 | Koskinen |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143542 A1 | 6/2013 | Kovvali et al. |
| 2013/0155849 A1 | 6/2013 | Koodli et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 | 7/2013 | Zhuang et al. |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0016487 A1 | 1/2014 | Dorenbosch |
| 2014/0029420 A1 | 1/2014 | Jeong et al. |
| 2014/0092306 A1 | 4/2014 | Lee et al. |
| 2014/0092734 A1 | 4/2014 | Lijung |
| 2014/0099945 A1 | 4/2014 | Singh et al. |
| 2014/0128074 A1 | 5/2014 | Vangala et al. |
| 2014/0141785 A1 | 5/2014 | Wang et al. |
| 2014/0161256 A1 | 6/2014 | Bari et al. |
| 2014/0204745 A1 | 7/2014 | Nuss |
| 2014/0247810 A1 | 9/2014 | Bontu et al. |
| 2014/0274066 A1 | 9/2014 | Fodor et al. |
| 2014/0295913 A1 | 10/2014 | Gupta |
| 2014/0335870 A1 | 11/2014 | Yilmaz et al. |
| 2015/0208280 A1 | 7/2015 | Lorca Hernando |
| 2015/0244520 A1 | 8/2015 | Kariman |

FOREIGN PATENT DOCUMENTS

| | | |
|---|---|---|
| EP | 2197228 | 10/2011 |
| EP | 2533571 | 12/2012 |
| EP | 2632072 | 8/2013 |
| EP | 2603046 | 12/2013 |
| WO | WO2010130134 | 11/2010 |
| WO | WO2011053204 | 5/2011 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

U.S. Office Action dated Apr. 14, 2016 in U.S. Appl. No. 13/707,551.
U.S. Office Action dated Mar. 22, 2017 in U.S. Appl. No. 13/707,551.
U.S. Office Action dated Jun. 9, 2017 in U.S. Appl. No. 14/967,625.
U.S. Appl. No. 13/707,531, filed Dec. 6, 2012.
U.S. Appl. No. 13/707,551, filed Dec. 6, 2012.
U.S. Appl. No. 13/707,532, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/084,578, filed Nov. 19, 2013.
U.S. Appl. No. 14/520,020, filed Oct. 21, 2014.
U.S. Office Action dated Jun. 27, 2012 in U.S. Appl. No. 12/946,611.
U.S. Office Action dated Mar. 22, 2012 in U.S. Appl. No. 12/946,611.
U.S. Notice of Allowance dated Nov. 2, 2012 in U.S. Appl. No. 12/946,611.
U.S. Office Action dated Mar. 13, 2012 in U.S. Appl. No. 12/624,643.
U.S. Notice of Allowance dated Aug. 8, 2012 in U.S. Appl. No. 12/624,643.
U.S. Office Action dated Sep. 13, 2013 in U.S. Appl. No. 13/681,141.
U.S. Office Action dated Apr. 22, 2013 in U.S. Appl. No. 13/681,141.
U.S. Office Action dated Apr. 7, 2014 in U.S. Appl. No. 13/681,141.
U.S. Office Action dated Mar. 12, 2014 in U.S. Appl. No. 13/707,551.
U.S. Office Action dated Mar. 4, 2015 in U.S. Appl. No. 13/707,534.
U.S. Office Action dated Jul. 20, 2015 in U.S. Appl. No. 13/707,534.
U.S. Office Action dated Jun. 24, 2014 in U.S. Appl. No. 13/707,532.
U.S. Office Action dated Nov. 17, 2014 in U.S. Appl. No. 13/707,535.
U.S. Office Action dated May 12, 2015 in U.S. Appl. No. 13/707,535.
U.S. Office Action dated Dec. 24, 2014 in U.S. Appl. No. 13/707,531.
U.S. Office Action dated Jul. 9, 2015 in U.S. Appl. No. 13/707,531.
U.S. Office Action dated Dec. 10, 2014 in U.S. Appl. No. 13/707,551.
U.S. Office Action dated Mar. 24, 2015 in U.S. Appl. No. 13/707,551.
U.S. Office Action dated Dec. 24, 2014 in U.S. Appl. No. 13/707,538.
U.S. Office Action dated Jul. 1, 2015 in U.S. Appl. No. 13/707,538.
U.S. Office Action dated Jan. 22, 2015 in U.S. Appl. No. 13/707,539.
U.S. Office Action dated Jan. 22, 2015 in U.S. Appl. No. 14/059,401.
U.S. Office Action dated Feb. 19, 2015 in U.S. Appl. No. 14/084,578.
U.S. Office Action dated Jun. 17, 2015 in U.S. Appl. No. 14/084,578.
U.S. Office Action dated May 11, 2015 in U.S. Appl. No. 14/064,329.
U.S. Office Action dated May 19, 2015 in U.S. Appl. No. 14/035,584.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.

(56) References Cited

OTHER PUBLICATIONS greendiary.com/entry/15-cellphone-chargers-that-harness-kinetic-energy-for-a-clean-recharge/ Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009, GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996): 82-90. http://inrg.csie.ntu.edu.tw/course/wms/paper/Pollin96.pdf.
Raza, Syed Numan, "LTE Performance Study," Master of Science Thesis, Feb. 9, 2012.
Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Office Action dated Nov. 16, 2015 in U.S. Appl. No. 13/707,534.
U.S. Office Action dated Sep. 30, 2015 in U.S. Appl. No. 13/707,535.
U.S. Office Action dated Nov. 16, 2015 in U.S. Appl. No. 13/707,531.
Notice of Allowance dated Nov. 13, 2015 in U.S. Appl. No. 13/707,538.
U.S. Office Action dated Sep. 17, 2015 in U.S. Appl. No. 13/707,539.
U.S. Office Action dated Sep. 18, 2015 in U.S. Appl. No. 14/520,020.
U.S. Office Action dated Oct. 6, 2016 in U.S. Appl. No. 13/707,539.
U.S. Office Action dated Aug. 12, 2016 in U.S. Appl. No. 13/707,551.
U.S. Office Action dated Nov. 8, 2017 in U.S. Appl. No. 13/707,539.
U.S. Office Action dated Dec. 12, 2017 in U.S. Appl. No. 14/084,578.
U.S. Notice of Allowance dated Nov. 13, 2017 in U.S. Appl. No. 14/967,625.

* cited by examiner

NETWORK BASED SPEED DEPENDENT LOAD BALANCING

CROSS-REFERENCE TO RELATED APPLICATIONS

This application is a continuation of U.S. patent application Ser. No. 14/059,401, entitled "Network Based Speed Dependent Load Balancing," filed Oct. 21, 2013, now U.S. Pat. No. 9,226,197, which is incorporated herein by reference in its entirety.

TECHNICAL FIELD

The subject disclosure relates to wireless communications and, also generally, to network based speed dependent load balancing.

BACKGROUND

The use of mobile devices and the resulting mobile traffic has been growing at a very fast pace and the trend shows no signs of stopping. To meet the mobile traffic growth and improve the end user experience, mobile service providers are actively looking for mechanisms to improve network efficiency, system capacity, and end user experience. To meet the demand of higher traffic and to improve the end user experience, mobile telecommunications operators are deploying metro cells (also referred to as small cells) in an attempt to help improve coverage and capacity. Mobile telecommunications operators have also been adding more carriers to meet the traffic demand.

BRIEF DESCRIPTION OF THE DRAWINGS

Various non-limiting embodiments are further described with reference to the accompanying drawings in which.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed aspects provide an enabler for intelligent network selection and load balancing between different types of cells (e.g., macro cells, metro cells, and so on) within a cellular network. The network selection can be based on cell-type, mobility state of the user equipment device, and, optionally, other criteria including, for example, real-time network load conditions, user equipment device channel quality, and other information. Advantages of the various aspects provided herein relate to improvement of an end user experience by choosing proper target cells based on mobility state and cell-type in order to reduce unnecessary handovers. Another advantage relates to reducing a number of signaling messages sent by the system, which is a result of the reduction of the unnecessary (or excessive) handovers. Other advantages of the disclosed aspects include, but are not limited to, improved network efficiency, reduced connection failure rate, avoidance of unnecessary handovers, and improved user experience.

Figure 1:
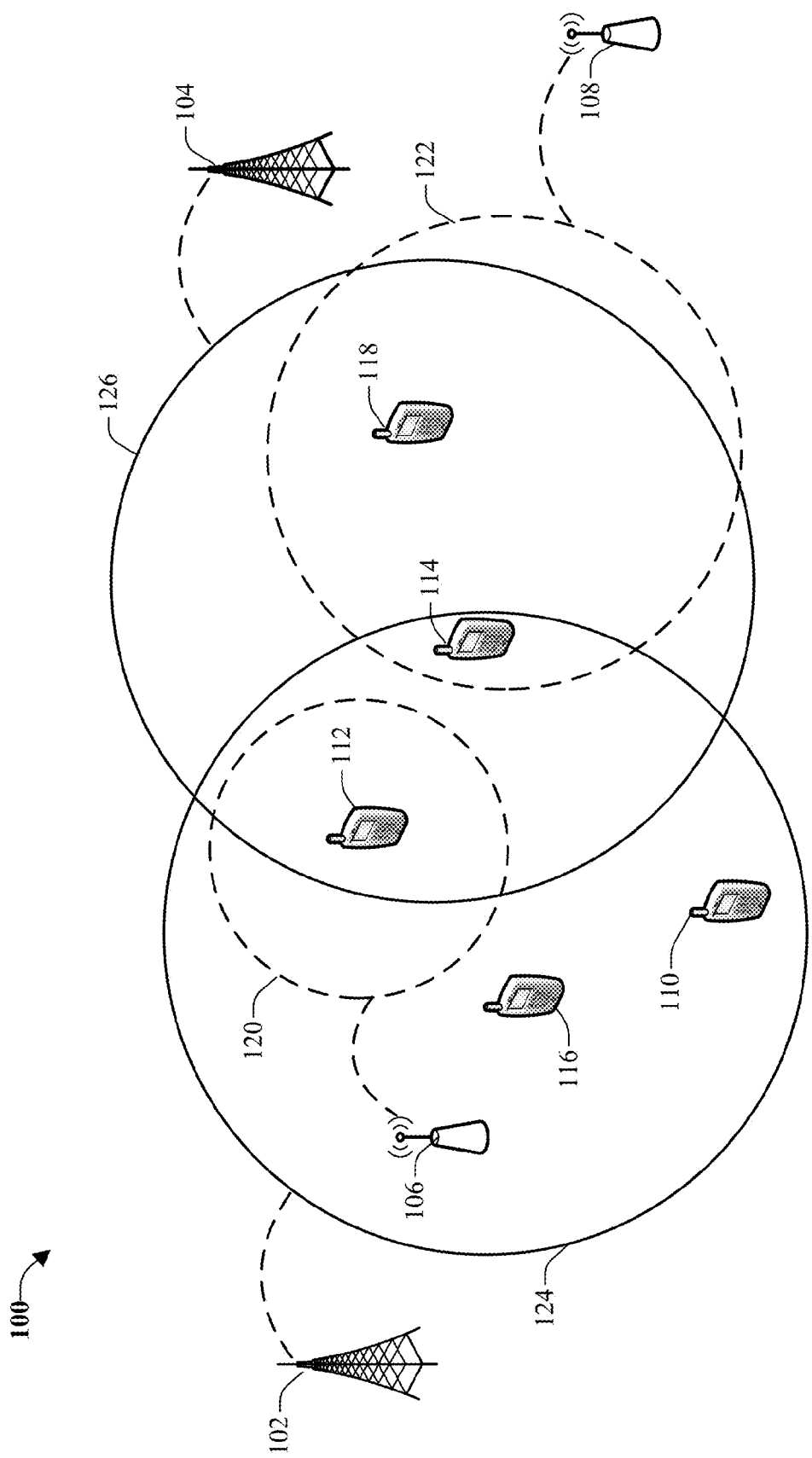
FIG. 1 illustrates an example, non-limiting wireless communications environment that can be utilized with the disclosed aspects.

FIG. 1 illustrates an example, non-limiting wireless communications environment 100 that can be utilized with the disclosed aspects. The wireless communications environment 100 can include a multitude of wireless communications networks, each having a respective coverage area. The coverage area of some of the wireless communications networks can overlap such that one or more mobile devices might be served by any of the network devices whose coverage areas overlap. For example, the networks might overlap in accordance with different radio access technologies and may also overlap in radio range such that a first network is capable of receiving signals broadcast by one or more other networks. Further, the wireless communications environment 100 can be a heterogeneous environment that includes heterogeneous networks, which can include multiple different types of cells such as, for example, macro cells, metro cells, femto cells, micro cells, pico cells, and so forth.

A macro cell is a cell in a wireless communications system that provides radio coverage served by a high power cellular access point (or base station) and, therefore has a large coverage area, such as a range of tens of kilometers. A metro cell is a cell in a wireless communications system that provides radio coverage served by a low power cellular access point (or base station) and, therefore has a smaller coverage area than a macro cell. A femto cell is a small, low power cellular access point that can be used in a home or small business, for example. A femto cell is a subset of a type of cell referred to as small cells, which are low-powered radio access nodes that operate in licensed spectrum and unlicensed spectrum and have a range of 10 meters to 1 or 2 kilometers, for example. A micro cell is a cell in a wireless communications system that is served by a low power access point and covers a limited area (e.g., a shopping mall, a hotel, and so on). A micro cell usually has a coverage area that is larger than the coverage area served by a pico cell. A pico cell is a small access point that can cover a small area (e.g., a building) and is used to extend coverage of signals to indoor areas and/or to add network capacity in areas with dense wireless communications usage.

Wireless communications environment 100 includes one or more macro cells 102, 104 and one or more other types of cells, such as one or more small cells 106, 108 deployed within the wireless communications environment 100 and servicing one or more user equipment devices 110, 112, 114, 116, 118. Each wireless communications network (e.g., macro cells 102, 104 and small cells 106, 108) comprises one or more network devices (e.g., a set of network devices) that operate in conjunction in order to process network traffic for the one or more user equipment devices 110, 112, 114, 116, and 118. For example, macro cells 102, 104 can comprise a set of devices that are macro cell enabled devices. In another example, the small cells 106, 108 can include a set of devices that are small cell enabled devices. It is noted that although these networks are described as macro cells 102, 104 and small cells 106, 108, the networks can be other types of cells (e.g., metro cells, femto cells, and so on). Any reference to a particular cell-type is used for purposes of discussion and not limitation according to the various aspects.

As illustrated, each of the one or more small cells 106, 108 has a corresponding service area 120, 122. Further, each of the one or more macro cells 102, 104 has a corresponding service area 124, 126. However, it should be understood that the wireless communications environment 100 is not limited to this implementation. Instead, any number of cells (e.g., macro cells, small cells, femto cells, and so on) and respective service areas can be deployed within the wireless communications environment 100. Further, the geographic areas or cell coverage area can be any shape and can have any dimensions. Thus, the illustrated embodiment should be understood as being illustrative and should not be construed as being limiting in any way.

Further, although only five user equipment devices 110, 112, 114, 116, 118 are illustrated; any number of user devices 110, 112, 114, 116, 118 can be deployed within the wireless communications environment 100. A user equipment device 110, 112, 114, 116, 118 may contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. In addition, the user equipment devices 110, 112, 114, 116, 118 and/or the networks can include functionality as more fully described herein.

In an aspect, the macro cells 102, 104 and the small cells 106, 108 can monitor their surrounding radio conditions (e.g., by employing respective measurement components). For example, each of the macro cells 102, 104 and small cells 106, 108 can determine network traffic load on its respective network by performing a network diagnostic procedure. As an example, during a network listen procedure, macro cells 102, 104 and small cells 106, 108 can scan their radio environment to determine network performance statistics. Various parameters associated with macro cells 102, 104 and small cells 106, 108 can be detected during the network diagnostic procedure, such as, but not limited to, frequency bands, scrambling codes, common channel pilot power, bandwidth across respective networks, universal mobile telecommunications system terrestrial radio access receive signal strength indicator, and so on.

In an example scenario, user equipment devices 110, 112, 114, 116, 118 can be serviced by networks through one of the macro cells 102, 104, or small cells 106, 108. As a user equipment device 110, 112, 114, 116, 118 is moved within the wireless communications environment 100, the respective user equipment device 110, 112, 114, 116, 118 might be moved in and out of the coverage area of the associated serving network. For example, as a user is sending/receiving communications through their respective user equipment device 110, 112, 114, 116, 118, the user might be walking, riding in a car, riding on a train, moving around a densely populated urban area (e.g., a large city), wherein the movement might cause the user equipment device 110, 112, 114, 116, 118 to be moved between various wireless communications networks. In such cases, it is beneficial to route the network traffic (e.g., handoff) from a serving network to a target network in order to continue the communication (e.g., avoid dropped calls).

Depending on location, user equipment devices 110, 112, 114, 116, 118 can have the option to connect to any number of networks. In one scenario, user equipment device 116 might be handed off (e.g., the network traffic of the user equipment device can be routed) from the macro cell 102 to the small cell 106. The small cell might be a good choice for routing of the network traffic of the user equipment device 116 if the device is being moved slowly. However, if the user equipment device 116 is being moved at a fast rate, the network traffic might be routed (e.g., handed off) to the small cell 106 and, a short time later, might need to be routed out of the small cell 106 and into macro cell 104 or small cell 108.

During either of these two handovers (e.g., into the small cell 106 and then into the macro cell 104 or small cell 108) there is a possibility that the connection might be lost (e.g., dropped call) or that other negative impacts to the user experience could occur (e.g., disruption during the communication, slow response of data, and so on). Therefore, in accordance with the disclosed aspects, based in part on the device mobility state (e.g., speed, direction, pattern, and so forth), the small cell 106, in this example, might be bypassed and the network traffic of the device routed from macro cell 102 to macro cell 104 (skipping or bypassing small cell 106 (and/or small cell 108)). This bypassing of the small cell 106 can occur even if the small cell 106 has properties that are more desirable than the macro cell 104 (e.g., higher power level, lower congestion or network traffic, and so on), which is determined based on the speed at which the user equipment device 116 is being moved. In another example, a macro cell might be bypassed and the user traffic of a mobile device might be routed from a small cell (or from a macro cell) to a small cell. It is noted that although various aspects are discussed with respect of routing traffic from a macro cell to a small cell, the disclosed aspects are not limited to this implementation. Instead, the network traffic can be routed from a small cell to a macro cell, or from a small cell to another small cell, or from a macro cell to a macro cell, and so on.

In an aspect, user equipment devices 110, 112, 114, 116, 118 can connect to any available network based on real-time or near-real time network condition statistics and mobility state of the respective user equipment device 110, 112, 114, 116, 118. Continuing with an example scenario, user equipment device 116 for example, can determine if small cell 106 or macro cell 104 offers a higher quality of experience and user equipment device 116 can connect to the selected small cell 106, for example, based, in part, on a mobility state of the user equipment device 116. For example, if the user equipment device 116 is determined to be moving at a low speed (e.g., below a threshold level), it might be beneficial to route the traffic of the user equipment device 116 to the small cell 106. Further to this example, user equipment device 114 might determine macro cell 104 offers a higher quality of experience based in part on the device moving at a higher speed (e.g., above a threshold level) and user equipment device 114 can connect to the selected macro cell 104 based, in part on the mobility state of the device 114. For example, the mobility state information can indicate that the user equipment device 114 is moving at a speed that is not conductive to the metro cell-type.

In some situations, when an option is available where a particular user equipment device 110, 112, 114, 116, 118 can be serviced by either a cellular broadcast server (e.g., a macro cell) or a Wi-Fi access point (e.g., a small cell), for example, the Wi-Fi access point might automatically be selected. For example, the user equipment device 110, 112, 114, 116, 118 might have user preferences established, which indicates that when a Wi-Fi network is available, network traffic of the user equipment device should be routed to the Wi-Fi network. Such user preferences might be established because, in some cases, there is no associated cost to the user of the user equipment device 110, 112, 114, 116, 118 when a Wi-Fi network is utilized, as compared to usage of a cellular network. Thus, the network traffic of the user equipment device 110, 112, 114, 116, 118 is automatically routed to the Wi-Fi network, regardless of the load on the Wi-Fi network and/or other considerations, which could result in a negative user experience (e.g., dropped communications, poor communications, and so on).

However, according to some aspects discussed herein, rather than automatically connecting to a Wi-Fi access point, other considerations can be utilized to route the network traffic of the user equipment device 110, 112, 114, 116, 118 to the Wi-Fi network, or to determine that the network traffic should remain on the cellular network and/or move to a different cellular network. For example, instead of moving to the Wi-Fi network automatically when the Wi-Fi network is available, a comparison is made between the Wi-Fi network and a cellular network while also considering the mobility state of the device 110, 112, 114, 116, 118. For example, if the device 110, 112, 114, 116, 118 is moving at a relatively high speed and the parameters of the macro cell and small cell are both within acceptable levels, the network traffic of the device 110, 112, 114, 116, 118 might bypass the small cell 106, 108 and be routed to the macro cell 102, 104. This bypassing of the small cell 106, 108 can reduce the amount of signaling messages because signaling messages are not needed to handoff to the small cell 106, 108 and then, shortly thereafter, handoff to the macro cell 102, 104 (e.g., only one handoff procedure is needed to route the network traffic to the macro cell 102, 104 instead of to the small cell 106, 108 and then to another small cell 106, 108 or to the macro cell 102, 104).

According to various aspects discussed herein, a user equipment device 110, 112, 114, 116, 118 can continuously, periodically, or based on other temporal conditions, receive data indicative of network statistics (e.g., traffic load or congestion on the network, capability of the network, and so on). As network performance changes, a user equipment device 110, 112, 114, 116, 118 can determine that at least a portion of its respective network traffic should be routed to a different network. The determination can be made based on real-time, or real-near time, network statistics.

In accordance with an implementation, the routing of network traffic can be based in part on an access network discovery and selection function policy. The access network discovery and selection function policy can be received from a network server that can be configured to push (e.g., broadcast) the information to the user equipment device 110, 112, 114, 116, 118. The network selection policy can include logic that can instruct the user equipment device 110, 112, 114, 116, 118 to select or recommend a network based, at least in part, on network statistics, which can include network conditions and load conditions (e.g., network congestion). According to some implementations, one or more network collection agents can monitor multiple networks and can periodically, continuously (e.g., repeatedly) push updated network statistic information to the user equipment device 110, 112, 114, 116, 118. Such periodic and/or continuous updates can enable real-time or near real-time knowledge of the network conditions by the user equipment device 110, 112, 114, 116, 118.

User equipment devices 110, 112, 114, 116, 118 can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH® Communication across a network can be packet-based; however, radio and frequency/amplitude modulation networks can enable communication between communication devices 110, 112, 114, 116, 118 using appropriate analog-digital-analog converters and other elements. Communication is enabled by hardware elements called "transceivers." User equipment devices 110, 112, 114, 116, 118 can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice traffic, data traffic, and so on) between one or more components can include, wired communications (e.g., routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like). In accordance with some embodiments, one or more of the user equipment devices 110, 112, 114, 116, 118 can be capable of simultaneous connection to the networks. For example, a user equipment device 110, 112, 114, 116, 118 can be a multimode device.

A network can include a plurality of elements that host logic for performing tasks on the network. The logic can be hosted on servers, according to an aspect. In packet-based wide-area networks, servers may be placed at several logical points on the network. Servers may further be in communication with databases and can enable communication devices to access the contents of a database. Billing servers and application servers are examples of such servers. A server can include several network elements, including other servers, and can be logically situated anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information.

Figure 2:
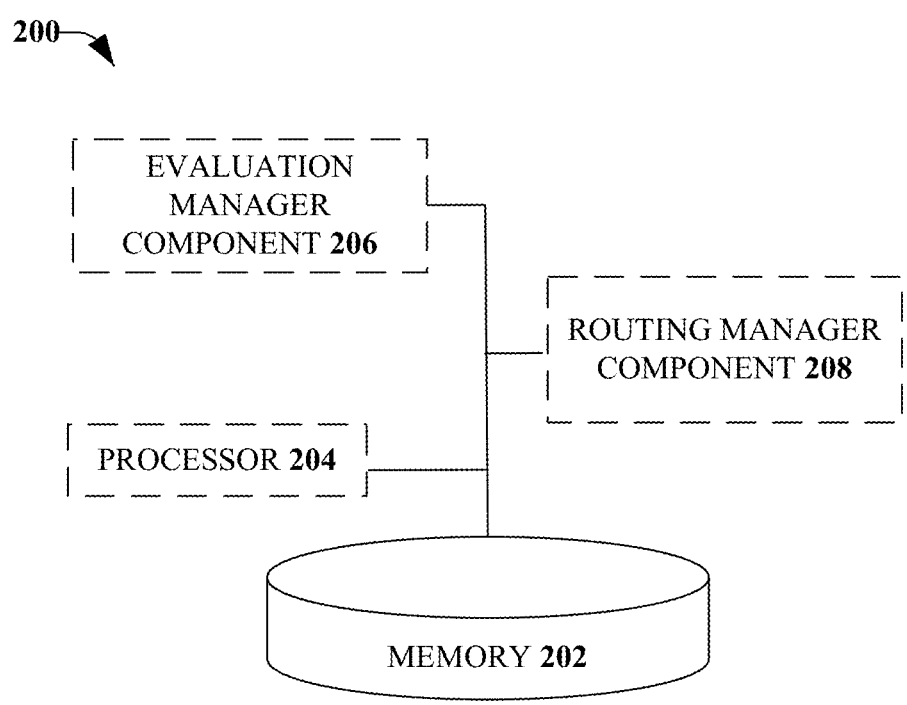
FIG. 2 illustrates an example, non-limiting system for network selection and load balancing, according to an aspect.

FIG. 2 illustrates an example, non-limiting system 200 for network selection and load balancing, according to an aspect. The one or more aspects disclosed herein enhance a standard user equipment device reporting mechanism by adding user equipment device mobility state to the device report that is sent to the radio access network (RAN) for mobility event and load balancing purposes. The RAN can be part of one or more communications networks, such as eNB, for example, and can use the mobility state information combined with the knowledge of the cell-type (e.g., macro cell, metro cell, distributed antenna system (DAS), and so on) and the carrier frequency of itself as well as the neighbor cells (e.g., target cells) to make a proper decision of whether to move or route the network traffic of the user equipment device to another cell and which cell is the appropriate cell.

As mentioned, mobile traffic has been growing at a very fast pace and the trend is continuing. To meet the mobile traffic growth demand and improve the end user experience, mobile service providers are actively looking for mechanisms to improve system capacity and end user experience. Deploying metro cells (also referred to herein interchangeably as small cells) can help to improve coverage and capacity. In addition, operators are adding more carriers (e.g., in long term evolution (LTE)) to meet the traffic demand. It is noted that although various aspects are described with reference to an LTE network, the aspects can be applied to other networks including a 3G network, for example.

Network performance and user experience are important to mobile operators. It has been observed that handover (e.g., routing of network traffic) is a factor impacting voice quality and the user equipment device speed has an impact (which at times can be significant) on the handover performance. This is even more pronounced in heterogeneous network environments. Metro cells typically have lower output power and smaller coverage as compared to macro cells. As disclosed herein, for a given mobile device, the most suitable cell for its traffic depends on its mobility state (e.g., the speed, direction, and the pattern the device is moving), the received signal level, the types of cells (macro cell, metro cell, DAS, and so on) and the associated radio network congestion situation. For example, a user equipment device might be under the coverage of both a macro cell and a metro cell and the user equipment device might be moving (e.g., the user is driving in a car at 30 miles per hour). In this example, the user equipment device receives a stronger signal level from a metro cell, which could be lightly loaded as compared to the macro cell. However, given the speed at which the user equipment device is being moved, the user equipment device would be better served by the macro cell, which can avoid unnecessary handovers (and reduce a number of signaling messages sent by the system). However, estimating the mobility state from the RAN is a challenging task and conventional solutions do not have the effective solution provided herein. If the network does not have the knowledge of the user equipment device mobility state, the network could decide to handover the user equipment device to the metro cell based on the signal level as an effort to perform load balancing. This could lead to more handover events for the initial hand-in and later handout after the device moves out of the coverage of the metro cell, which increases the amount of signaling needed to perform the multiple handovers. Further, some frequency carriers have better performance than other frequency carriers in supporting high mobility users (e.g., 700 is better than advanced wireless service (AWS) band in that sense). Feedback on the mobility state to the network is helpful for both heterogeneous networks (HetNet) and inter-frequency mobility and load balancing.

With continuing reference to FIG. 2, the system 200 comprises at least one memory 202 (e.g., a memory device) that can store computer executable components and instructions. System 200 can also include at least one processor 204 (e.g., a processor device), communicatively coupled to the at least one memory 202. Coupling can include various communications including, but not limited to, direct communications, indirect communications, wired communications, and/or wireless communications. The at least one processor 204 can execute or facilitate execution of the computer executable components stored in the at least one memory 202. The at least one processor 204 can be directly involved in the execution of the computer executable component(s), according to an aspect. Additionally or alternatively, the at least one processor 204 can be indirectly involved in the execution of the computer executable component(s). For example, the at least one processor 204 can direct one or more components to perform the operations.

It is noted that although one or more computer executable components may be described herein and illustrated as components separate from the at least one memory 202 (e.g., operatively connected to memory), in accordance with various embodiments, the one or more computer executable components could be stored in the at least one memory 202. Further, while various components have been illustrated as separate components, it will be appreciated that multiple components can be implemented as a single component, or a single component can be implemented as multiple components, without departing from example embodiments.

System 200 also includes an evaluation manager component 206 that can be configured to analyze various information associated with a user equipment device, a source network, and one or more target networks (or neighbor networks). The information analyzed by the evaluation manager component 206 can include a mobility state of the user equipment device. The mobility state can include information related to whether the user equipment device is stationary or is being moved. The mobility state can also include information as to a speed at which the mobile device is being moved and/or a pattern of movement. For example, the speed can be classified according to various rankings such as, for example, low, medium, and high. In another example, the speed can be classified as fast or slow. In a further example, the speed can be measured and if at or over a certain level (e.g., higher than a predetermined speed) the device is considered to be moving quickly and if under the certain level (e.g., under the predetermined speed), the device is considered to be moving slowly. Further, the direction the device is being moved can be analyzed, according to an aspect.

Other information that can be analyzed by the evaluation manager component 206 includes the power of each network or cell (e.g., source network, one or more neighbor or target networks). For example, the power of each cell can be measured as absolute power and can be expressed as the power ratio in decibels (dB) of the measured power referenced to one milliwatt (mW). The notation for this power ratio is dBm.

Further information that can be analyzed by the evaluation manager component 206 can include respective load conditions of the networks, respective coverage areas of the networks, and signal strengths associated with the networks. For example, a signal strength threshold is a reference signal received power (RSRP) over the reference signal subcarriers, in a long term evolution (LTE) implementation. In another example, a signal strength threshold can be a reference (received) signal code power (RSCP) in a universal mobile telecommunications system (UMTS) implementation. The respective signal strengths can be represented in a measurement report received from the user equipment device. In addition, the mobility state of the user equipment device can be received in the measurement report.

In an example, the mobility state of the mobile device can be utilized by the evaluation manager component 206 as a portion of a determination as to which network the network traffic should be route. For example, the mobility state information can be used by the evaluation manager component 206 to determine if it is appropriate for the mobile device to connect to a network given the movement or non-movement of the mobile device. For example, if the mobility state information indicates the mobile device is moving at 60 miles per hour and a metro cell is available, it might be decided by the evaluation manager component 206 to forgo connecting to the metro cell based on the relatively fast movement of the mobile device and a prediction that the mobile device will not be within range of a base station operating within the metro cell for a sufficient amount of time to handle voice and/or data communications between the mobile device and the metro cell. Alternatively, if the mobility state information indicates the mobile device is stationary and a metro cell is available, it can be decided by the evaluation manager component 206 to connect to the metro cell based upon the stationary state of the mobile device and the prediction that the mobile device will be within range of the metro cell for a sufficient amount of time to handle voice and/or data communications between the mobile device and the metro cell.

System 200 also includes a routing manager component 208 that can be configured to route network traffic of the mobile device to a network selected from a set of target networks. According to some aspects, one or more potential target networks are bypassed. For example, if the user equipment device is being moved at a relatively fast speed, small cells might be bypassed and the network traffic of the user equipment device might be moved to a macro cell. In another example, if the user equipment device is being moved in a direction that indicates the user equipment device will enter and exit the small cell in a short amount of time, the small cell can be bypassed and the network traffic of the device routed to the macro cell.

Figure 3:
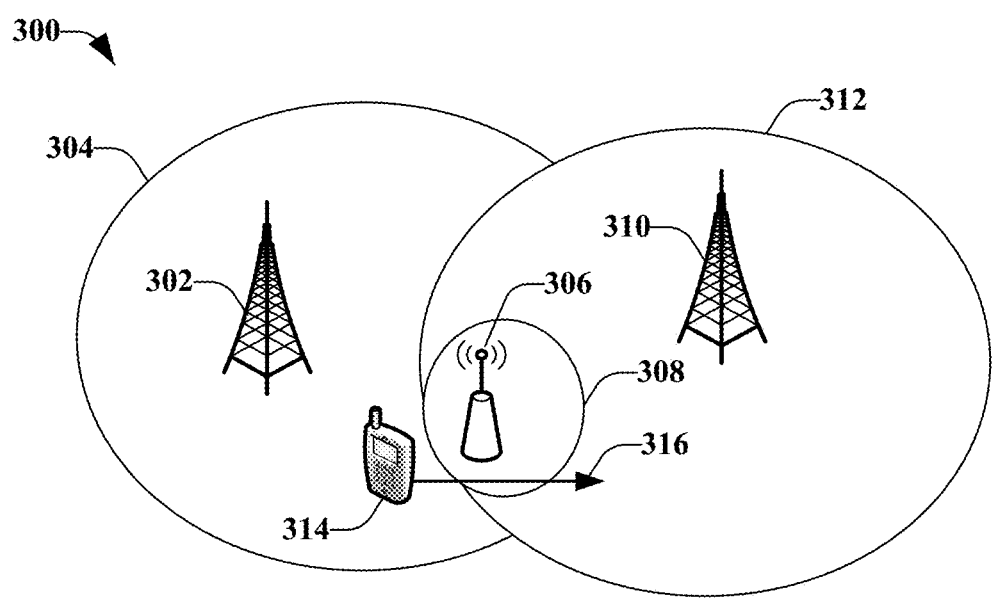
FIG. 3 illustrates an example, wireless network environment that can be utilized with the disclosed aspects.

FIG. 3 illustrates an example, wireless network environment 300 that can be utilized with the disclosed aspects. Illustrated is a first cell 302, which can be a current serving cell, and its associated coverage area 304. Also illustrated are a second cell 306 and its associated geographic coverage area 308. For purposes of this example, the second cell 306 is a target network that includes a set of devices that are metro cell enabled devices (e.g., a metro cell network). Also illustrated are a third cell 310 and its associated geographic coverage area 312. For this example, the third cell 310 is a target network that includes a set of devices that are macro cell enabled devices (e.g., a macro cell network). Also illustrated is a user equipment device 314.

In this example, the user equipment device 314 is being moved in the direction indicated by arrow 316 and at a speed of 35 miles-per-hour. Further, for this example, the following assumptions related to the user equipment device radio frequency (RF) environment apply and it is assumed that these conditions stay constant for purposes of this example. The first cell 302 (macro cell) has a power of −105 dBm. The second cell 306 (metro cell) has a power of −90 dBm. Further, the third cell 310 (macro cell) has a power of −95 dBm. Additionally, in this example, the handover threshold plus hysteresis is equal to 5 dB, the TimeToTrigger (TTT) is 1 second (note, both hysteresis and TTT can be mobility state dependent).

The user equipment device 314 detects its mobility state, as discussed herein, which is 35 miles per hour (in this example), which can be considered as a medium speed, according to some implementations. An A5 (or A3) event can be triggered, which indicates the first cell 302 is below an acceptable threshold and that the second cell 306 and/or the third cell 310 are better than the first cell by 5 dB (e.g., the RSRP from the first cell 302, the second cell 306, and the third cell 310 are reported).

As per various aspects disclosed herein, the user equipment mobility state (medium in this example) is added to the A3/A5 measurement report. Adding the mobility state to the measurement report provides the network (e.g., current service network, first cell 302) with knowledge of the user equipment device mobility state. According to some implementations, a direction or pattern in which the user equipment device is moving also can be included in the measurement report.

Further to this example, the eNB behavior is that the first cell 302 exchanges cell-type information with its neighbors (e.g., the second cell 306 and the third cell 310). According to an implementation, the cell-type information can be exchanged via X2, however, other manners of exchanging the information could be utilized and the various aspects are not limited to this example.

In an implementation, the cell-type information can identify a cell (or network) as being of a particular cell type. The cell-type information can include an explicit specification of a cell-type of one or more networks. For example, a cell information message can include text that explicitly names the cell-type for a given network.

As another example, the cell information message might include a code or identifier by which the cell-type can be ascertained. For example, the system may include a table or other data structure by which to cross-reference cell-type codes or identifiers with cell types. In an example, non-limiting implementation, the cell-type can be associated with a particular identity or range of identities. For example, an ID range of 100-49,999 may be assigned to macro cells, and a range of 40,000-200,000 may be assigned to metro cells, and so forth.

The cell information message can include any message that is capable of being transmitted over a radio/air interface. Further, the cell information message can be sent using any physical, transport, and/or logical channels. These channel types are known and, therefore, will not be described in further detail herein.

At about the same time as the first cell 302 receives the A3/A5 measurement repot, the first cell 302 (e.g., current serving cell) evaluates the information. As indicated in the assumptions provided above for this example, the first cell 302 determines that both the second cell 306 and the third cell 310 have measurement levels (e.g., the corresponding RSRP levels) that are at or above an acceptable threshold. Further, evaluation by the first cell 302 results in discarding (or disregarding) the second cell 306 as a target cell. The determination to discard the second cell 306 is based on the mobility state of the user equipment device 314 (e.g., moving at a medium speed level) and the cell type (e.g., metro cell). Thus, the second cell 306 is removed from consideration even though the second cell 306 is considered the better neighbor (based on a consideration between the second cell 306 and the third cell 310). This is because the speed at which the user equipment device 314 is being moved would cause the user equipment device 314 to move into and out of the coverage area of the second cell 306 relatively quickly. Therefore, in this example, the third cell 310 is chosen because the third cell 310 meets the handover threshold (5 dB<−0.95−(−105)), and the user equipment device 314 speed is greater than or equal to (>=) medium. Thus, the decision is that the target cell is the third cell 310 and the network traffic of the user equipment device 314 can be routed (e.g., handed off) from the first cell 302 and routed to (e.g., handed into) the third cell 310.

By analyzing information related to the mobility state of the user equipment device 314, a decision can be made to bypass one or more smaller cells and prefer a larger cell(s) (e.g., a macro cell) and/or to bypass one or more larger cells and prefer a small cell(s). The avoidance of unnecessary handovers and/or extra handovers (e.g., quickly moving the traffic into and out of a smaller cell) can improve network efficiency, avoid unnecessary handovers, and reduce the amount of signaling messages needed to handover the user equipment device 314 (e.g., the user traffic of the user equipment device 314). This can also reduce a connection failure rate and improve the user experience.

Figure 4:
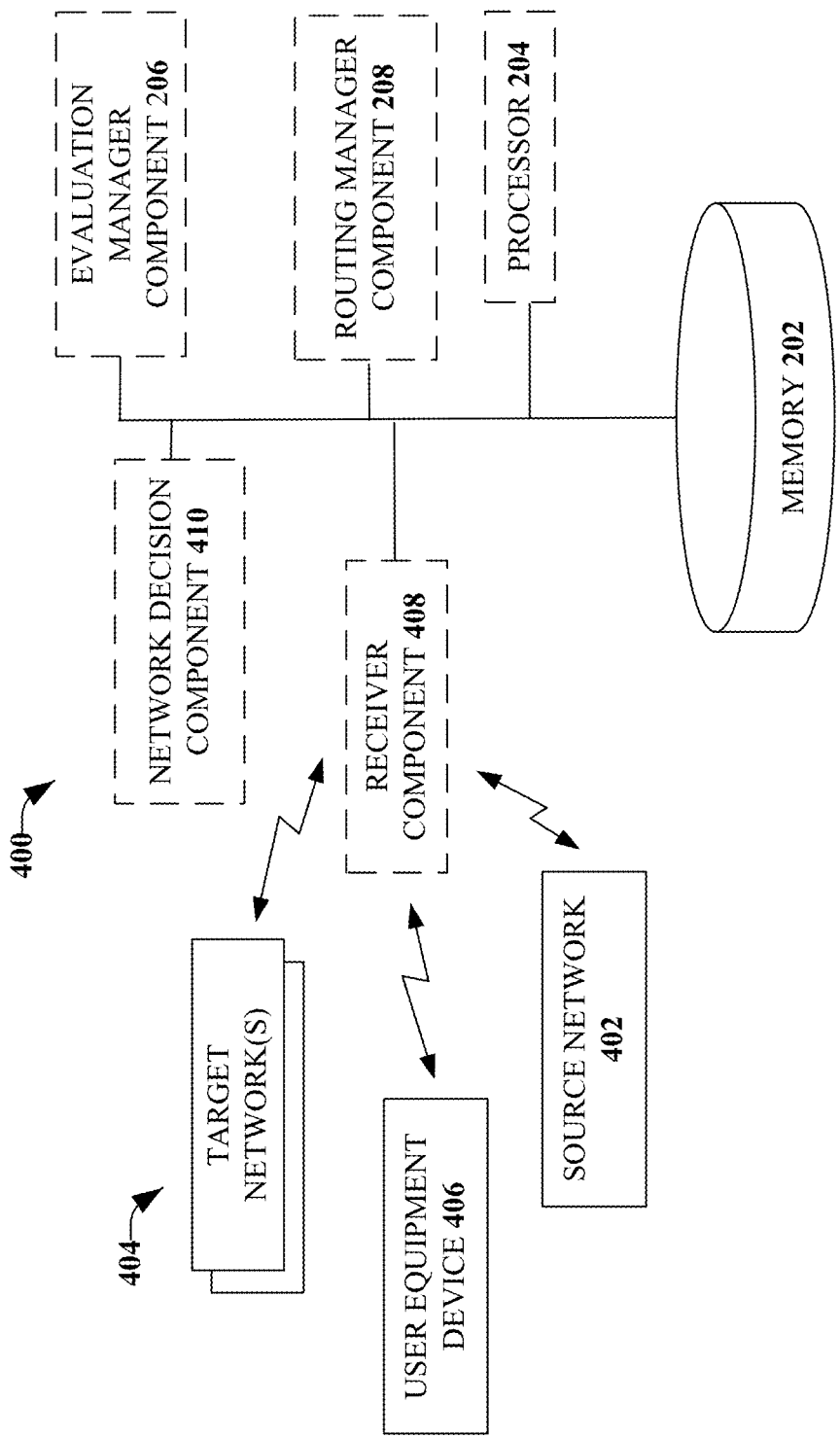
FIG. 4 illustrates an example, non-limiting system configured to perform network selection, according to an aspect.

FIG. 4 illustrates an example, non-limiting system 400 configured to perform network selection, according to an aspect. System 400 includes a memory 202 and a processor 204 operatively connected to the memory 202. Also included is an evaluation manager component 206 that can be configured to analyze various information related to source network 402, one or more target networks 404, and a user equipment device 406. According to an implementation, a receiver component 408 can be configured to obtain the information from the source network 402, the one or more target networks 404, and the user equipment device 406.

In some implementations, the system 400 can be implemented by the source network 402 (e.g., the system components are located within the source network 402 or are implemented by one or more devices of a source network). In this situation, the information related to the source network 402 might already be known by the evaluation manager component 206. For example, the evaluation manager component 206 might already have knowledge related to the type of network for which the source network 402 is configured (e.g., macro cell, femto cell, metro cell, and so on). In various implementations, the source network 402 is a macro network (e.g., comprises a set of devices that are macro cell (or macro-network) enabled devices). However, in some implementations, the source network 402 can be a small cell network (e.g., small cell, micro cell, femto cell, and so on).

The receiver component 408 can also be configured to receive load condition(s) of each of the target networks 404. For example, there might be a single target network or, according to some implementations, there might be two or more target networks 404. The two or more target networks 404 might be different types of networks (e.g., macro network, metro network, pico network, and so on). Further, information related to the coverage area of each of the target networks 404 can also be obtained by the receiver component 408.

The receiver component 408 also can be configured to receive, from the user equipment device 406, a mobility report. The mobility report can include a mobility state of the user equipment device 406. The mobility state is a function of a movement pattern of the user equipment device 406 and a speed at which the user equipment device 406 is being moved. For example, the movement pattern can be represented by a set of pattern data and the speed can be represented by speed data. Various techniques can be utilized by the user equipment device 406 to determine its mobility state. According to an aspect, techniques for performing speed detection and radio selection using accelerometers are described in U.S. Pat. No. 8,385,917, entitled "Radio Selection Employing Transit Data Determined from Kinetic Energy Generation", which is incorporated by reference in its entirety.

According to some implementations, the user equipment device 406 transmits measurement report data, which is received by the receiver component 408. The measurement report data can include the mobility state of the user equipment device 406 and respective signal strengths associated with each of the target networks 404. For example, the measurement report might indicate that a signal strength of the current serving cell (e.g., source cell) has fallen below an acceptable level. The measurement report might also indicate that the signal strength, as measured by the user equipment device 406, of the one or more target cells is above (or meets) an acceptable level. It is noted that signal strength can be an entry level criteria such that a neighbor cell (e.g., potential target cell) is not even considered if its signal strength is not at an acceptable level.

Based on the measurement report received from the user equipment device 406 and the information received from the source network 402 and target networks 404, a determination is made whether to route user traffic of the user equipment device 406 from the source network 402 and, if so, which target network 404 should be chosen.

According to an implementation, a network decision component 410 can be configured to utilize the information received from the target networks 404, including network traffic load information, and user equipment device 406 to determine which network the user equipment device 406 should connect to. The network decision component 410 can be an application program that includes computer-executable instruction that, when executed by the one or more processors 204 causes the system 400 to analyze the received information and to instruct the user equipment device 406 to connect to the selected network.

In an example, the network traffic or load information received from the various networks can include historic network load information, which is load information obtained based upon network load experienced by the respective network in the past or otherwise in non-real-time. According to some aspects, the historic network load information is used by the network decision component 410 and/or evaluation manager component 206 to identify one or more network load trends over a specified period of time. This trending network load information can be used to predict times during which the network load is favorable as well as the times during which the network load will not be favorable for supporting communications between the user equipment device 406 and the respective target network 404.

In another example, the network traffic information includes current network load information, which is data that is obtained based upon a network load experienced by the network. Real-time, in this context, is the actual time during which a network load is experienced by the network. Near real-time, in this context, is the actual time during which a network load is experienced by the base station, plus a delay on the order of seconds, minutes, or any other order of magnitude thereof, for example. What constitutes near-real time network load information as compared to historic network load information can be defined by a service provider providing service to the network.

The network load information can include a number of active devices (e.g., devices currently engaged in a call or data session). In other embodiments, the load information includes a number of idle devices (e.g., devices currently camped on a given cell). The load information can include active load information and idle load information, which can be utilized separately or together to select a target network 404.

According to some aspects, the network decision component 410 can utilize additional information to select the particular network. This information can include, but is not limited to, one or more policies and/or one or more user profiles. A policy can be one or more settings, one or more configurations, one or more rules, and so forth, that define, at least in part, one or more courses of action in view of one or more conditions to be used by the network decision component 410 to decide which target network 404 the user equipment device 406 should be connected to. In some aspects, a policy includes one or more rules that specific one or more if-then conditions for handling a particular situation, such as redirecting network traffic based upon a speed at which the user equipment device 406 is being moved. In accordance with some aspects, a policy can include one or more matrices of cause and effect conditions, tables of actions, and so on for responding to or dealing with various stimuli, include network conditions, mobile device mobility state, and so on.

Figure 5:
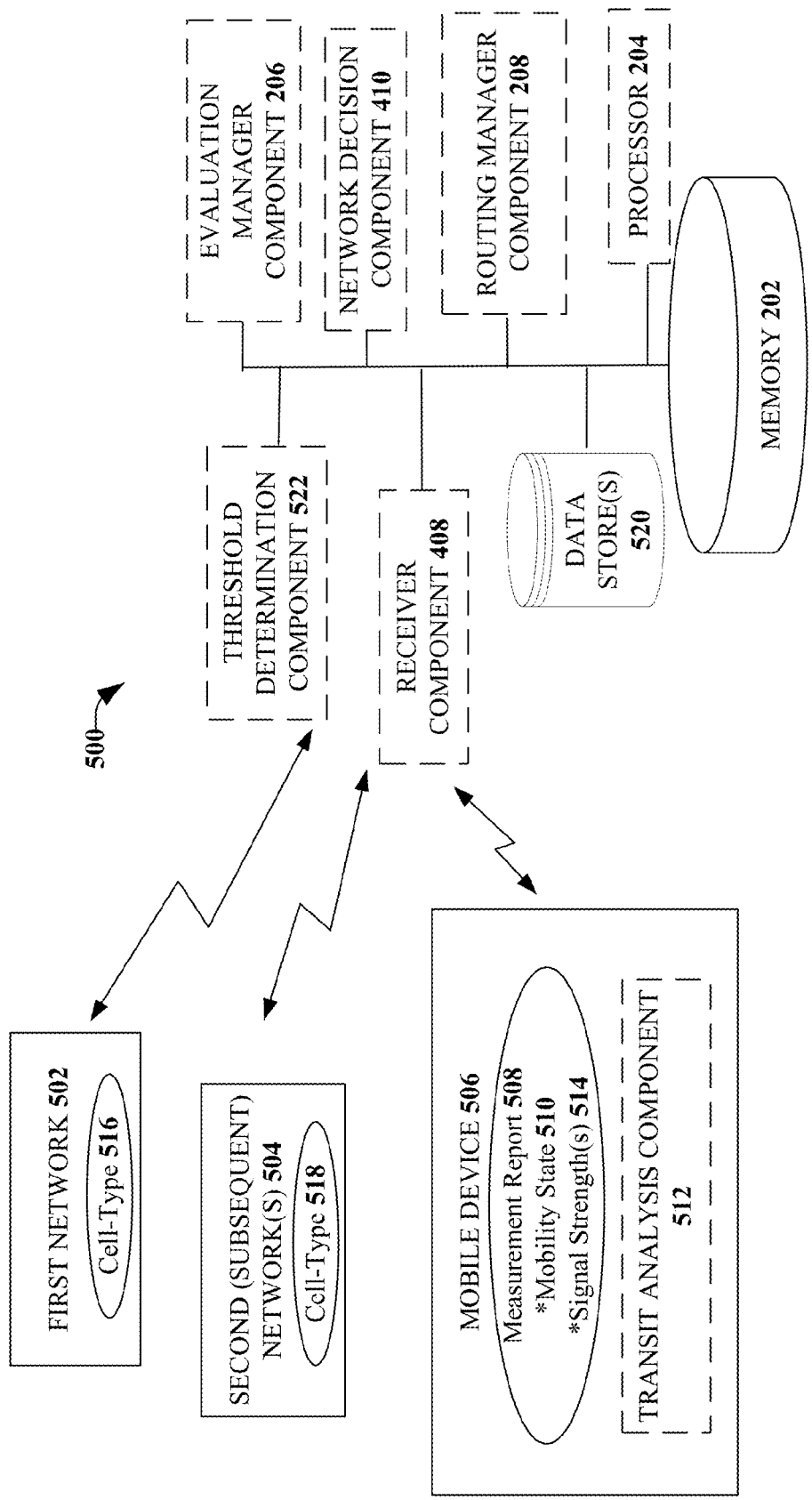
FIG. 5 illustrates an example, non-limiting system for network selection, according to an aspect.

FIG. 5 illustrates an example, non-limiting system 500 for network selection, according to an aspect. System 500 includes a memory 202 and a processor 204, coupled to the memory 202. The processor 204 facilitates execution of executable instructions included in the memory 202 to perform operations.

Also included in a system 500 is an evaluation manager component 206 that analyzes transmit information received from and/or related to a first set of devices of a first network 502, a second set of devices of a second network 504 (and subsequent sets of devices of subsequent networks), and a mobile device 506. For example, a receiver component 408 can obtain a measurement report 508 from the mobile device 506, which can be reported under a connected condition. The measurement report 508 can include a mobility state 510 of the mobile device 506. The mobility state 510 can be a function of a movement pattern of the mobile device 506 and a speed at which the mobile device 506 is being moved.

According to an implementation, the mobile device 506 can comprise a transit analysis component 512 that can be configured to analyze transit data of the mobile device 506 to obtain a mobility state 510 of the mobile device 506. For example, the transit analysis component 512 can determine that the mobile device 506 is being moved rapidly based in part on a frequency component associated with the movement. In an example, a frequency can be associated with train travel. Further to this example, movement of the mobile device 506 (or a pattern of the movement) indicates a frequency associated with a train crossing track welds, acceleration/deceleration of a train from/into a station, swaying of the train car during transit, and so forth.

In another example, an irregular sinusoidal nature of a frequency can indicate that the mobile device 506 is being moved, but that such movement would not result in handoffs between networks. For example, the irregular sinusoidal nature can indicate foot tapping, a leg bouncing while the user is seated, and so on. As another example, the gait of the user walking with the mobile device 506 can be regular and the rise and fall of the body can be periodic. As a further example, the high frequency vibrations of a turbine engine (e.g., a jet engine) can produce recognizable frequency patterns.

Other considerations that can be taken into account by the transit analysis component 512 include the data source information. Such information can include a model, type, brand, date of manufacture, aging or environmental characteristics and so on. Other information includes a data type, such as voltage, current, temporal, numeric, ratio, instant historical, and so on. Also considered can be a data acquisition window, data acquisition environment, historic data, user preferences, user defined data, data reference frame(s), multiple data sources, and so on.

The transit analysis component 512 can utilize various motion sensors including, but not limited to, global positioning system (GPS) data, accelerometers, speed calculations between access points for given time intervals, and so on. Further, the transit analysis component 512 can analyze information associated with the various motion sensors to determine close matches (or perfect matches) between known (or inferred) patterns and accessible mobile device transit patterns.

The measurement report 508 can also include signal strengths 514 measured by the mobile device 506. For example, the signal strengths 514 included in the measurement report 508 can include a first signal strength associated with the first set of devices of the first network 502. Other single strengths 514 included in the measurement report 508 can include a second signal strength associated with the second set of devices of the second network 504, as well as other (or subsequent) signal strengths associated with additional networks that are under consideration.

According to an implementation, the mobile device 506 can generate feedback related to a preferred network of the target networks to which the mobile device 506 should connect. The feedback can be transmitted to the receiver component 408 and can be utilized by the evaluation manager component 206 and/or network decision component 410 to make the network decision.

Each of the first network 502 and the second network 504 (as well as other networks) can report their respective cell-types 516, 518 to the system 500, such as in a cell broadcast message. In an example, the neighbor cell information can be reported through a system information block (SIB), however, other manners of reporting the information can be utilized. In some aspects, the cell broadcast message can be included in a SIB, which can contain other information. The SIB may be a new SIB configured to include the network traffic load information. Alternatively, the SIB can be an existing SIB that has been modified to include the network traffic load information.

The respective cell-types 516, 518 (as well as other information) can be retained in one or more data stores 520. According to an implementation, the one or more data stores 520 can be integrated with the evaluation manager component 206 and/or memory 202. In another implementation, the one or more data stores 520 can be located external to, but accessible by, the evaluation manager component 206 and/or memory 202. It is noted that a data store can include volatile memory or nonvolatile memory, or can include both volatile memory and nonvolatile memory. By way of illustration, and not limitation, nonvolatile memory can include read only memory, programmable read only memory, electrically programmable read only memory, electrically erasable programmable read only memory, or flash memory. Volatile memory can include random access memory, which can operate as external cache memory. By way of illustration and not limitation, random access memory is available in many forms such as static random access memory, dynamic random access memory, synchronous dynamic random access memory, double data rate synchronous dynamic random access memory, enhanced synchronous dynamic random access memory, Synchlink dynamic random access memory, and direct Rambus random access memory. The memory (e.g., data stores, databases, and so on) of the various disclosed aspects is intended to comprise, without being limited to, these and any other suitable types of memory.

According to an implementation, prior to the evaluation manager component 206 analyzing the various information, a threshold determination component 522 ascertains whether the reported signal strengths 514 meet or exceed a threshold level. For example, a signal strength 514 of a source network is compared to one or more neighbor networks (or target networks). If the reported signal strength 514 of a target network is not at least as good as the source network, or does not exceed the reported signal strength of the source network, that particular target network is removed from consideration and the network traffic of the mobile device 506 is not routed to that network by the routing manager component 208. However, if the reported signal strength 514 of a network meets the entry level criteria, further analysis of that network is considered in combination with the mobility state 510 of the mobile device 506.

In an example, if a target network is a metro cell and the mobile device 506 is moving too fast, that metro cell will not be a good target network for the device traffic to move to even though that small cell might have a good radio frequency (RF) condition and might be lightly loaded (e.g., has a low congestion level). This is because if the mobile device 506 is moving too fast and the network traffic of the mobile device 506 is moved to that small cell, it is likely that the mobile device 506 will move out of the coverage area of that small cell soon after the network traffic is handed off to that small cell. In this case, the network traffic will have to be handed out of the small cell again, which can have a negative performance impact due to the multiple, unnecessary handoffs.

According to some implementations, the various aspects disclosed herein can utilize an artificial intelligence component (not shown), which can facilitate automating one or more features in accordance with the disclosed aspects. As discussed herein, the disclosed aspects can be utilized to route user traffic of a mobile device to a target network such that network efficiencies can be improved and an amount of signaling messages being transmitted is reduced, as well as other advantages as compared to conventional systems. The disclosed aspects in connection with network selection and load balancing can employ various artificial intelligence-based schemes for carrying out various aspects thereof. For example, a process for receiving network congestion conditions and parameters and a mobility state of a mobile device, comparing the network congestion conditions and parameters with one or more usage and one or more movement parameters of a user equipment device can be facilitated with an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be types of radio networks, congestion thresholds and the classes can be a type of traffic usage (e.g., voice traffic, data traffic, short message service traffic, and so on), the amount of network traffic usage, the expected location of a user equipment device based on a movement parameter, the speed at which the mobile device is being moved, and so on.

A support vector machine is an example of a classifier that can be employed. The support vector machine can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing usage of the user equipment device, by observing a movement pattern of the user equipment device, and so on). For example, support vector machines can be configured via a learning or training phase within a classifier constructor and feature selection module. Thus, the classifier(s) can be used to automatically learn and perform a number of functions, including but not limited to ascertaining network traffic should be routed from a source network to a target network, determining the user equipment device is likely to be moved into the coverage area of one or more networks, determining one or more target networks should be bypassed (e.g., not used as the target network) even though parameters associated with the network are better than other networks that are not bypassed, and so forth. Further functions can include, but are not limited to, gathering information (e.g., network traffic usage information, network congestion information) from a group of devices (e.g., a set of network devices), aggregating the data gathered from the subject user equipment device, comparing two or more networks in conjunction with the device mobility state to determine the most appropriate network for routing of the network traffic, and so on. The criteria can include, but is not limited to, a type of network, patterns associated with mobile device usage and movement, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, in local, cloud, and/or virtualized environment, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor and/or one or more network devices comprising at least one processor.

Figure 6:
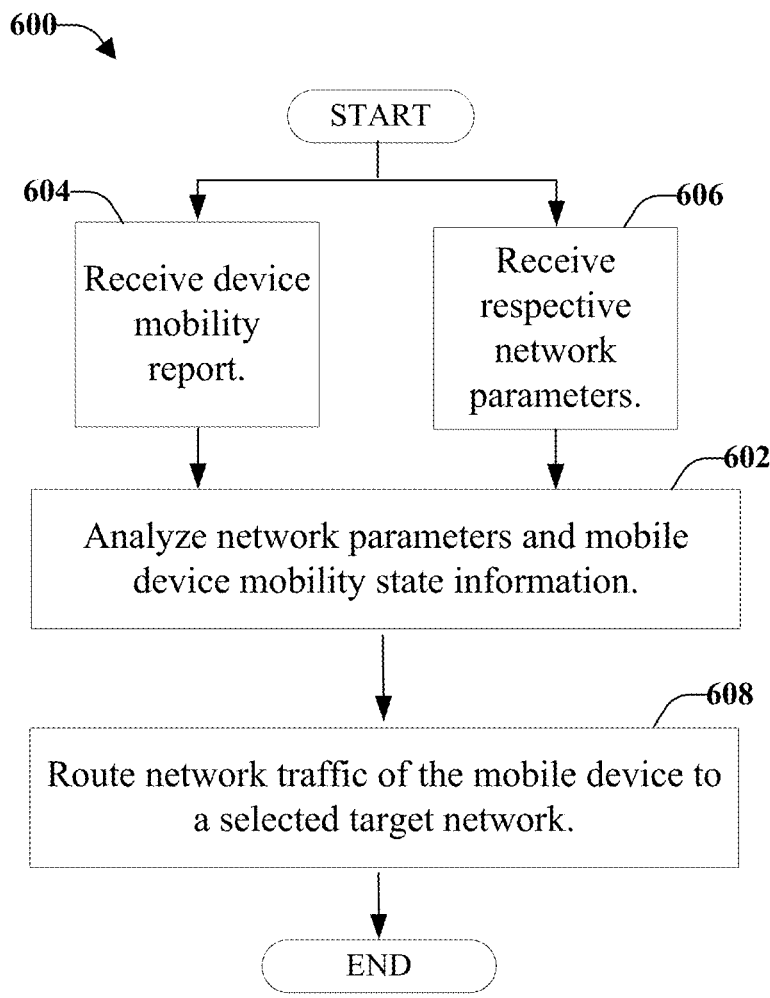
FIG. 6 illustrates an example, non-limiting method for network selection, according to an aspect.

FIG. 6 illustrates an example, non-limiting method 600 for network selection, according to an aspect. At 602, network parameters of one or more target networks and mobility state information of a mobile device are analyzed. The network parameters can include respective load conditions, respective coverage areas, and respective signal strengths of one or more target networks. For example, respective load conditions and respective coverage areas of a first set of devices of a first network and a second set of devices of a second network can be included in the analysis. Further, a first signal strength associated with the first set of devices and a second signal strength associated with the second set of devices can be included in the analysis.

The mobility state of the mobile device is a function of a movement pattern of the mobile device and a speed at which the mobile device is being moved. A mobility parameter can relate to whether the user equipment device is stationary or is moving and, if moving, a speed at which the user equipment device is being moved. For example, the user equipment device might be stationary (e.g., a user of the user equipment device is sitting at her desk). In another example, the user equipment device might be moved and traveling at any of a variety of different speeds, which can be a function of the mode of transportation (e.g., walking, riding a bicycle, in a car, on a train, in an airplane, and so on). Further, the speed might change over time. For example, the user might be traveling in a car and then get out of the car and walk the remaining distance until arriving at her destination.

Another parameter relates to the direction that the user equipment device is being moved. The direction can be a horizontal direction, which can be associated with cardinal directions or cardinal points (e.g., north, south, east, west, or intermediate points). Further, the direction can include an altitude (or changes in the height) of the user equipment device. For example, the user equipment device might be traveling in an elevator and a range of one network might not reach all points along that altitude (e.g., connectivity is only enabled at the higher locations).

According to an implementation, the mobility state, the first signal strength, and the second signal strength are represented in measurement report data received from the mobile device, at 604. The method 600 also can include receiving respective network parameters, at 606. The network parameters can include cell-type information related to the first set of network devices and the second set of network devices. A first cell-type of the first set of network devices can be different from a second cell-type of the second set of network devices. The parameters received can also include respective network congestion levels, capability of the network, geographic coverage area information, and so on. According to an aspect, a network traffic coverage area of the second set of devices at least partially overlaps another network traffic coverage area of the first set of devices.

According to an implementation, the analysis can include determining the speed at which the mobile device is being moved satisfies a first speed level condition and a micro cell is chosen as a potential target cell to route the network traffic. For example, if the mobile device is moving slowly or below a first speed level condition, a micro cell might be an appropriate choice for routing of the network traffic.

According to a further implementation, the analysis can include determining the speed at which the mobile device is being moved satisfies a second speed level condition. For example, the mobile device might be moving quickly and, based on the quick movement it is contemplated that the mobile device will quickly move into and out of the coverage area of a micro cell. Further to this aspect, the method can include bypassing the micro cell as a potential target cell to route the network traffic and choosing a metro cell as the potential target cell to route the network traffic.

In an implementation, if a neighbor or target network does not meet a certain threshold parameter, that network is removed from consideration for routing of the mobile device traffic. For example, a signal strength of the target network can be analyzed and, if the signal strength is below a predefined level, the target network is disregarded (e.g., not including in the network analysis).

At 608, network traffic of the mobile device is routed to a set of network devices selected from the first set of devices and the second set of devices, as a result of the analyzing. According to an implementation, the routing includes reducing a number of signaling messages sent by the system. In an example, the first set of devices are micro cell enabled devices and the second set of devices are macro cell enabled devices. Further to this example, reducing the number of signaling messages sent comprises bypassing the first set of devices, and the routing comprises routing the mobile device to the second set of devices.

Figure 7:
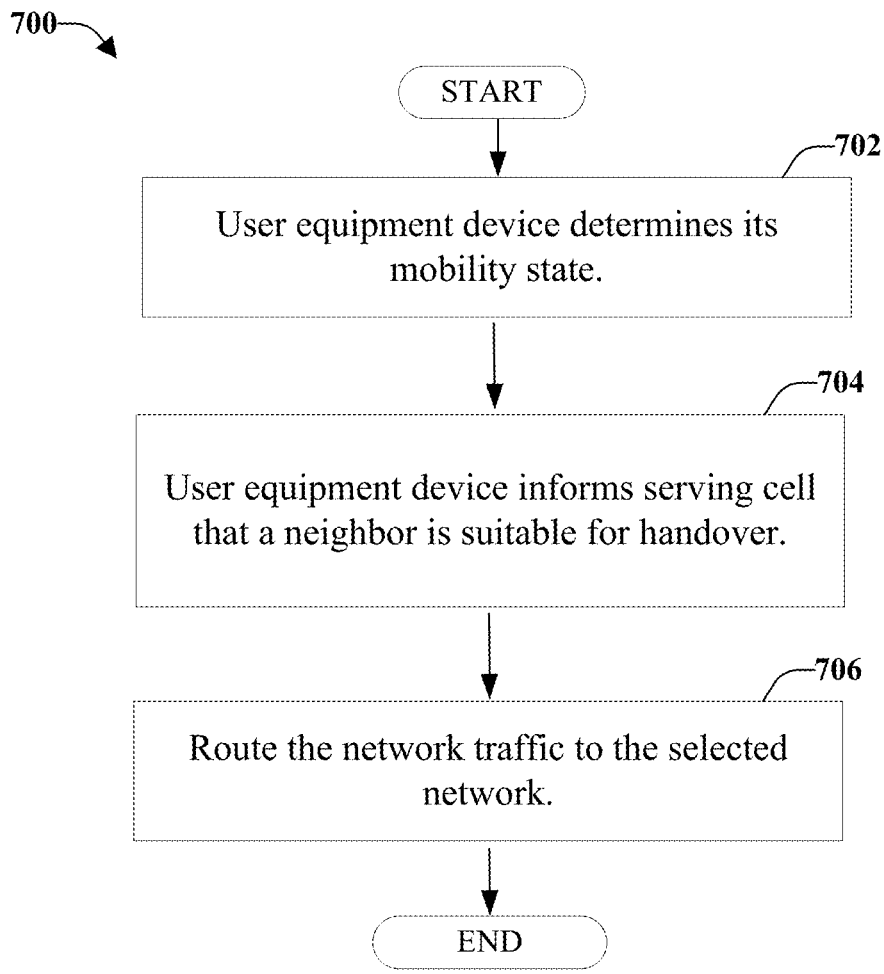
FIG. 7 illustrates an example, non-limiting method for implementation of network selection, according to an aspect.

FIG. 7 illustrates an example, non-limiting method 700 for implementation of network selection, according to an aspect. According to an aspect, the user equipment device reports its mobility state under the connected state. For example, the user equipment device can be in idle mode or connected mode.

At 702, the user equipment device determines its mobility state. For example, the user equipment device can determine whether it is static (e.g., not moving), moving at a slow speed, moving at a medium speed, or moving at a fast speed. The user equipment device can also determine its moving pattern. Various techniques can be utilized by the user equipment device to determine its mobility state and will not be described herein for purposes of simplicity.

At 704, the user equipment device informs the serving cell that a neighbor cell is suitable for handover. The information provided the serving cell also includes the mobility state of the user equipment device. For example, using various processes for load balancing, neighbor cell information is given by the serving eNB via SIB or other means. After receiving this information, the user equipment device triggers the reporting event to inform the serving cell about the neighbor cell. The determination by the user equipment device can be based on the RSRP/RSRQ level. The serving cell makes a decision whether to move the user equipment device to the target cell.

The network traffic of the user equipment device is routed to the target cell identified by the user equipment device or another cell selected by the eNB, at 706. For example, based on the cell-types of the serving cell and the neighboring cells, their load conditions, and the mobility state of the devices, the serving RAN node (e.g., eNB) can make the best decision on device mobility handover or whether to move a device to a target cell and if so, which target cell.

Therefore, the disclosed aspects can reduce an amount of signaling required by choosing a proper cell to which network traffic of the user equipment device should be routed, wherein the choice is based in part on a mobility state of the user equipment device. Other advantages can include improving a user experience and reducing communication failures, which might occur during handover (e.g., routing of network traffic between cells).

Figure 8:
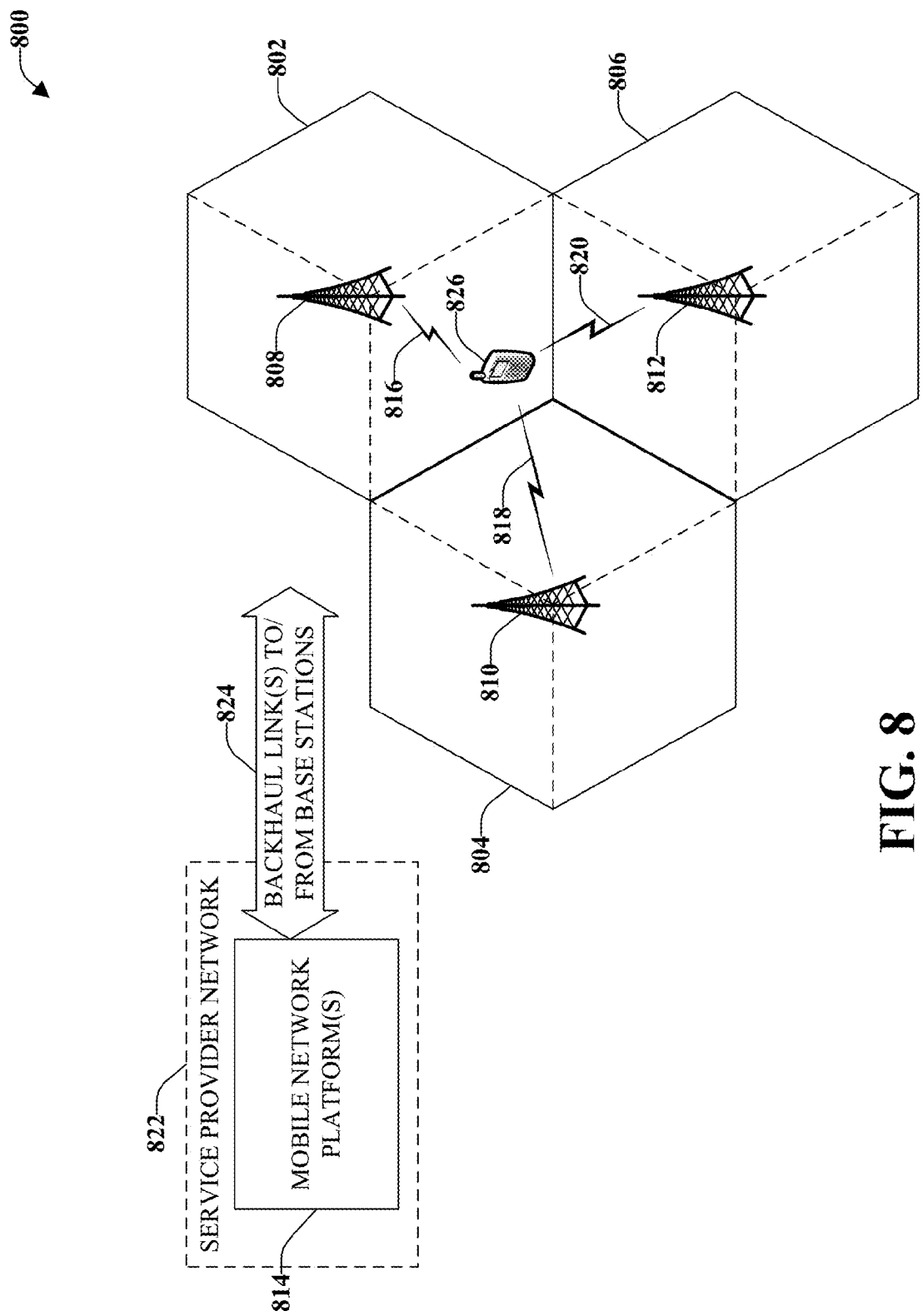
FIG. 8 is a schematic example wireless environment that can operate in accordance with aspects described herein.

By way of further description with respect to one or more non-limiting ways to facilitate network selection and load balancing, FIG. 8 is a schematic example wireless environment 800 that can operate in accordance with aspects described herein. In particular, example wireless environment 800 illustrates a set of wireless network macro cells. Three coverage macro cells 802, 804, and 806 include the illustrative wireless environment; however, it is noted that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a 2π/3 configuration in which each macro cell includes three sectors, demarcated with dashed lines in FIG. 8. It is noted that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 816, 818, and 820 embody a Uu interface (universal mobile telecommunication system Air Interface).

Mobile network platform(s) 814 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands or carriers, which include any electromagnetic frequency bands licensed by the service provider network 822 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 814 can be embodied in the service provider network 822.

In addition, wireless backhaul link(s) 824 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 824 embodies IuB interface.

It is noted that while exemplary wireless environment 800 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 9:
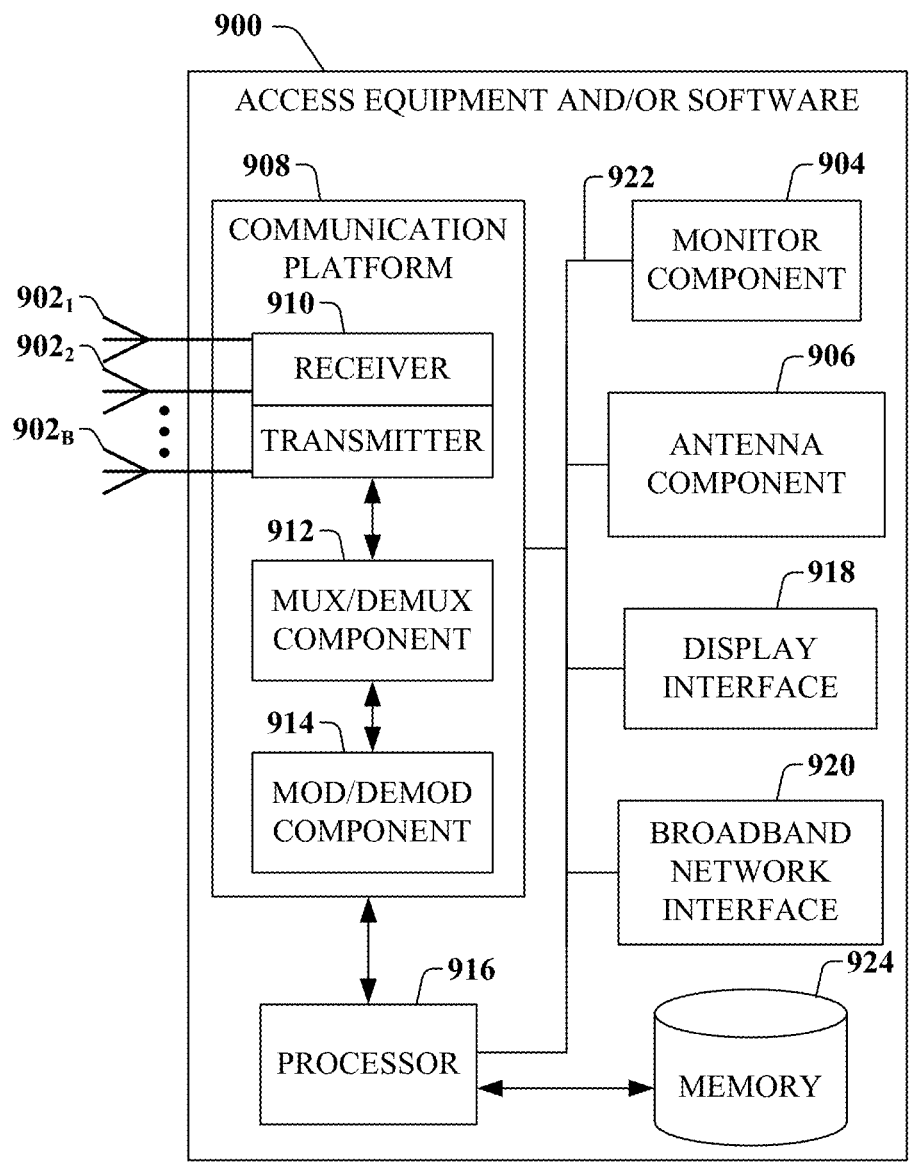
FIG. 9 illustrates a block diagram of access equipment and/or software related to access of a network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femto cell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation, with M a positive integer); phase-shift keying; and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be a liquid crystal display, a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)) access list(s) that authorize access to wireless coverage through access equipment and/or software 900, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software 900.

As is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 924, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 10:
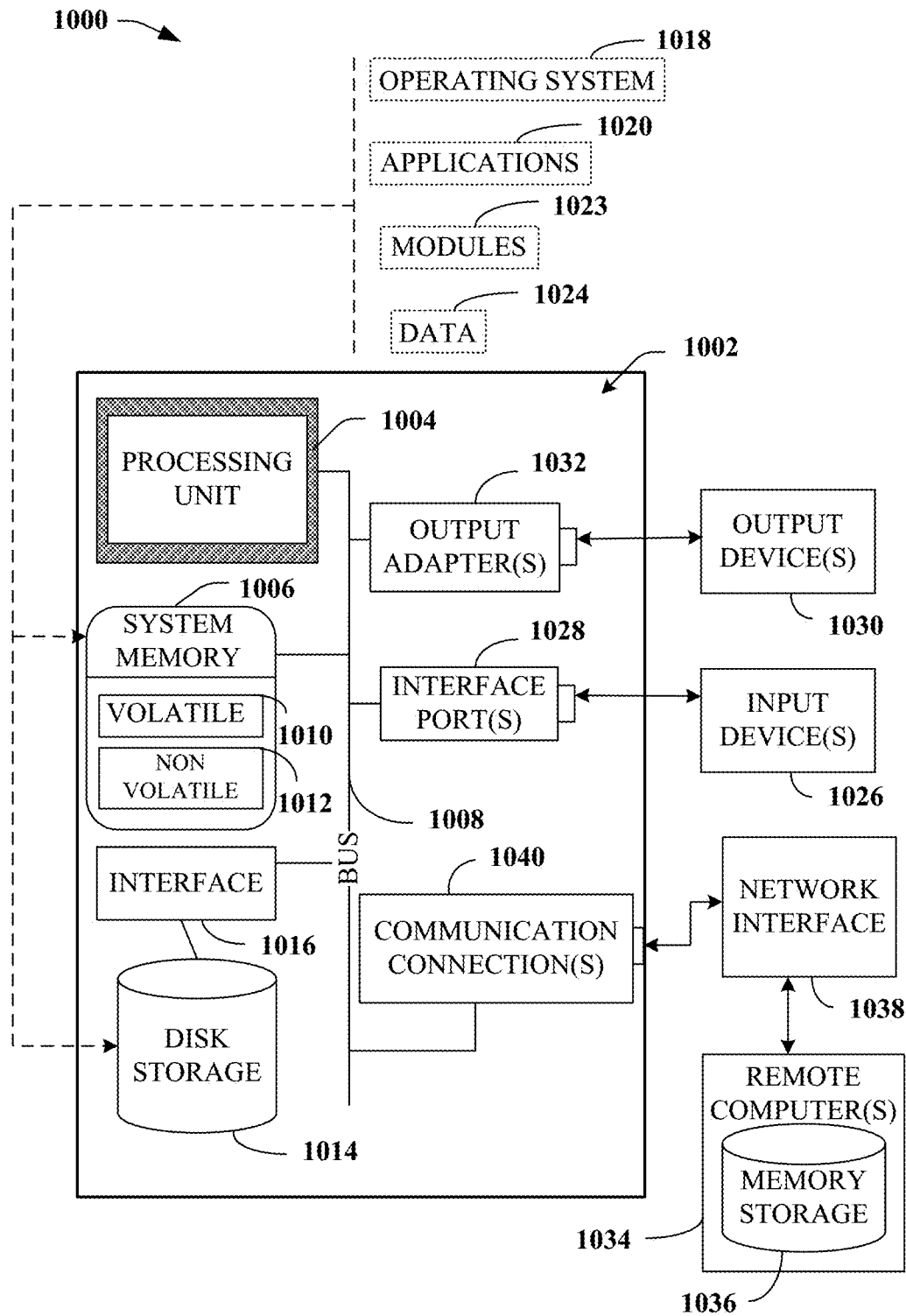
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as at least one memory 202) there can be software, which can instruct a processor (such as at least one processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1006 includes volatile memory 1010 and nonvolatile memory 1012. A basic input/output system, containing routines to transfer information between elements within computer 1002, such as during start-up, can be stored in nonvolatile memory 1012. By way of illustration, and not limitation, nonvolatile memory 1012 can include read only memory, programmable read only memory, electrically programmable read only memory, electrically erasable programmable read only memory, or flash memory. Volatile memory 1010 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1002 also includes removable/non-removable, volatile/non-volatile computer storage media. In an implementation, provided is a non-transitory or tangible computer-readable storage device storing executable instructions that, in response to execution, cause a system comprising a processor to perform operations. The operations can include analyzing respective load conditions and respective coverage areas of a first set of devices of a first network and a second set of devices of a second network, a mobility state of a mobile device, a first signal strength associated with the first set of devices, and a second signal strength associated with the second set of devices. The mobility state is a function of pattern data representing a movement pattern of the mobile device and speed data representing the speed at which the mobile device is being moved. The operations can also include routing network traffic of the mobile device to a set of network devices selected from the first set of devices and the second set of devices, as a result of the analyzing.

According to an implementation, the routing comprises reducing a number of signaling messages sent by the system. Further to this implementation, the first set of devices are micro cell enabled devices and the second set of devices are macro cell enabled devices, and reducing the number of signaling messages sent comprises bypassing the first set of devices, and the routing comprises routing the mobile device to the second set of devices.

FIG. 10 illustrates, for example, disk storage 1014. Disk storage 1014 includes, but is not limited to, devices such as a magnetic disk drive, floppy disk drive, tape drive, external or internal removable storage drives, superdisk drive, flash memory card, or memory stick. In addition, disk storage 1014 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1014 to system bus 1008, a removable or non-removable interface is typically used, such as interface component 1016.

It is to be noted that FIG. 10 describes software that acts as an intermediary between users and computer resources described in suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1023 and program data 1024 stored either in system memory 1006 or on disk storage 1014. It is to be understood that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus. Output device(s) 1030 use some of the same type of ports as input device(s) 1026.

Thus, for example, a universal serial bus port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It is also noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network computer, a workstation, a microprocessor based appliance, a peer device, or other common network node and the like, and typically includes many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A user equipment device comprising:
   a motion sensor;
   a processor; and
   memory comprising instructions that, when executed by the processor, cause the processor to perform operations comprising:
   measuring a first signal strength associated with a first network,
   measuring a second signal strength associated with a second network,
   receiving an output from the motion sensor,
   determining a mobility state of the user equipment device based, at least in part, upon the output received from the motion sensor, wherein the mobility state comprises a frequency component, and wherein the frequency component comprises an irregular sinusoidal nature of a frequency indicative of the user equipment device being moved, but that such movement alone would not result in a handoff between the first network and the second network,
   generating a measurement report comprising the first signal strength, the second signal strength, and the mobility state, and
   providing the measurement report to a network decision component for making a network decision regarding to which of the first network and the second network the user equipment device should connect.

2. The user equipment device of claim 1, wherein the mobility state further comprises a speed of the user equipment device.

3. The user equipment device of claim 1, wherein the operations further comprise:
   generating feedback related to a preferred network to which the user equipment device should connect; and
   providing the feedback to the network decision component for making the network decision regarding which of the first network and the second network the user equipment device should connect.

4. A method comprising:
   measuring, by a user equipment device, a first signal strength associated with a first network;
   measuring, by the user equipment device, a second signal strength associated with a second network;
   receiving, by the user equipment device, an output from a motion sensor of the user equipment device;
   determining, by the user equipment device, a mobility state of the user equipment device based, at least in part, upon the output received from the motion sensor, wherein the mobility state comprises a frequency component, and wherein the frequency component comprises an irregular sinusoidal nature of a frequency indicative of the user equipment device being moved, but that such movement alone would not result in a handoff between the first network and the second network;
   generating, by the user equipment device, a measurement report comprising the first signal strength, the second signal strength, and the mobility state; and
   providing, by the user equipment device, the measurement report to a network decision component for making a network decision regarding to which of the first network and the second network the user equipment device should connect.

5. The method of claim 4, wherein the mobility state further comprises a speed of the user equipment device.

6. The method of claim 4, further comprising:
   generating feedback related to a preferred network to which the user equipment device should connect; and
   providing the feedback to the network decision component for making the network decision regarding which of the first network and the second network the user equipment device should connect.

7. A non-transitory computer-readable storage device that stores executable instructions that, in response to execution by a processor of a user equipment device, cause the user equipment device to perform operations comprising:

measuring a first signal strength associated with a first network;

measuring a second signal strength associated with a second network;

receiving an output from a motion sensor of the user equipment device;

determining a mobility state of the user equipment device based, at least in part, upon the output received from the motion sensor, wherein the mobility state comprises a frequency component, and wherein the frequency component comprises an irregular sinusoidal nature of a frequency indicative of the user equipment device being moved, but that such movement alone would not result in a handoff between the first network and the second network;

generating a measurement report comprising the first signal strength, the second signal strength, and the mobility state; and providing the measurement report to a network decision component for making a network decision regarding to which of the first network and the second network the user equipment device should connect.

8. The non-transitory computer-readable storage device of claim 7, wherein the mobility state further comprises a speed of the user equipment device.

9. The non-transitory computer-readable storage device of claim 7, wherein the operations further comprise:

generating feedback related to a preferred network to which the user equipment device should connect; and providing the feedback to the network decision component for making the network decision regarding which of the first network and the second network the user equipment device should connect.

* * * * *